July 6, 1965

H. F. SWANSON 3,192,734

CABINET FOR DISPENSING GRANULATED ICE

Filed Nov. 8, 1961

115-230 VOLTS

Inventor
Herbert F. Swanson
by Roberts, Cushman & Grover
Attorneys

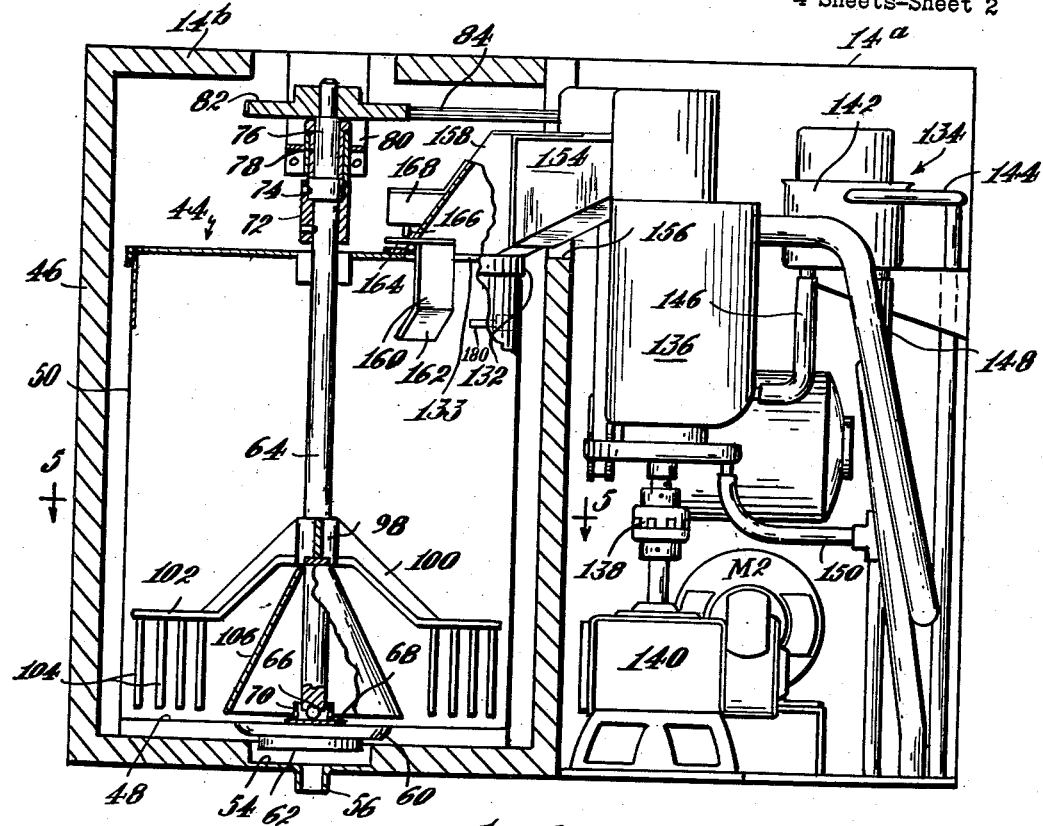

July 6, 1965  H. F. SWANSON  3,192,734
CABINET FOR DISPENSING GRANULATED ICE
Filed Nov. 8, 1961  4 Sheets-Sheet 4

United States Patent Office 3,192,734
Patented July 6, 1965

3,192,734
CABINET FOR DISPENSING GRANULATED ICE
Herbert F. Swanson, Boxford, Mass., assignor to Market Forge Company, Everett, Mass., a corporation of Massachusetts
Filed Nov. 8, 1961, Ser. No. 150,912
13 Claims. (Cl. 62—137)

This invention relates to hospital equipment and, in particular, to a cabinet unit for use in hospitals or like places, designed to provide storage space and all of the facilities required for the purpose of preparing prescribed nourishment and between-meal snacks, including hot plates and electrical connections therefor, hot and cold water spigots and connections therefor, a sink, a working counter, suitable lighting and, more especially, means to provide for an instant supply of granulated ice for use with drinking water or beverages, and being provided for this purpose with an ice maker storage bin and a dispenser assembly.

Heretofore, it has been nearly impossible to keep ice in a form ready for immediate use and, particularly, to store a quantity of granulated ice so that it could be dispensed from storage as substantially loose dry granules directly into a drinking glass, a pitcher, or the like. Moreover, it has been difficult to provide for storage of granulated ice for any substantial length of time without contamination due to melting and the collection of water at the bottom of the storage receptacle.

The principal objects of the invention are to provide apparatus for making, storing and dispensing ice in granular form without exposure to or contact with sources of contamination; to provide apparatus for making, storing and dispensing ice in which the granulated ice first made is always used first thereby to insure maximum freshness; to provide apparatus for making granulated ice at such a rate as to produce a useful quantity of ice sufficient to meet the demands at any given time; to provide apparatus for storing granulated ice in such fashion that it will not become packed and to keep it free of water and hence contamination; to provide apparatus for discharging granulated ice in whatever quantity is desired, for example directly into a drinking glass, tray, pitcher, or the like, without having to handle or otherwise touch it with implements or with the hands; and to provide apparatus for making additional ice as the stored ice is used.

As herein illustrated, the apparatus comprises a storage bin for holding a quantity of granulated ice, having an opening at its top, through which granulated ice may be supplied from an ice maker. At the bottom of the bin there is an eccentrically located discharge opening through which ice is discharged into the upper end of a spout by a sweep in the form of a comb movable about the bin for sweeping the ice across the opening. A closure is mounted adjacent the spout and is retractable to permit ice to be discharged and there is means operable, by retraction of the closure, to effect rotation of the comb. The comb has vertically disposed groups of spaced parallel teeth, spaced radially of its center of rotation, with their lower ends close to the bottom. At the far side of the discharge opening there are fixed teeth arranged to alternate with the teeth on the comb. The fixed teeth serve to check the mass of ice granules as they are moved forwardly by the comb teeth and to cause it to break up and fall through the discharge opening. A conical shroud is disposed at the center, inwardly of the comb teeth, for guiding the ice into the path of the comb, and there is a depressed area beneath the shroud having a drain hole into which water, at the bottom of the bin, may flow and thus maintaining the bottom of the bin substantially free of water at all times. In order to prevent drip from the spout a sleeve is disposed within the discharge opening having portions projecting above and below the bottom. In one form of the apparatus the upwardly projecting portion of the sleeve serves to prevent water at the bottom of the bin from flowing through the discharge opening. In this form of the apparatus the closure is held against the lower end of the spout. In the preferred construction the closure is situated between the lower end of the sleeve and the spout and is of larger diameter than the latter, so that drip from the discharge opening falls onto the top of the closure and is discharged therefrom beyond the upper end of the spout.

The ice maker is arranged to discharge ice through a closed chute directly into the top of the bin and there is a limit switch near the top opening operable, when the ice within the bin drops below a predetermined limit, to start the ice maker. The ice tends to peak as it is discharged from the ice maker into the bin and thus to build up to a point such as to operate the limit switch and stop the ice maker before the bin is in fact filled. To this end a thermostat is mounted near the top of the bin, beneath the opening, through which the ice enters which is operable, by contact of the ice therewith, to effect operation of the comb and move the mass away from the thermostat, and, by such movement away from the thermostat, to stop the motor. The thermostat operates repeatedly until the level of the ice reaches a height such as to actuate the limit switch to stop the ice maker. The chute which delivers the ice from the ice maker to the bin is rubber and optionally may have a microswitch mounted on it so that, when the ice peaks up to its underside and deforms, the microswitch will be actuated to start the motor which drives the comb thereby moving the ice away from the lower end of the spout. As soon as the spout returns to normal position the switch is again actuated to stop the comb.

The invention will now be described in greater detail with reference to the accompanying drawings wherein:

FIG. 3 is an elevation, partly in section, of an ice maker and one form of the dispensing unit removed from the cabinet and shown to much larger scale;

FIG. 4 is a fragmentary elevation of the drive for the dispenser;

FIG. 10 is a wiring diagram of an alternative control circuit.

Figure 1:
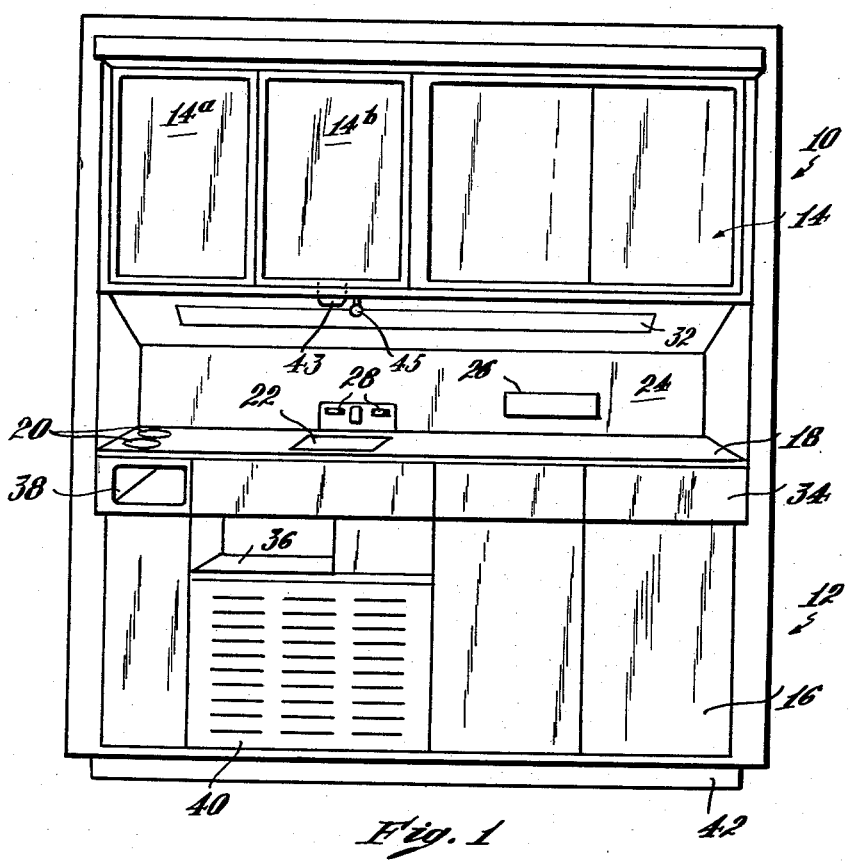
FIG. 1 is a front elevation of the cabinet unit provided with the ice making and ice dispensing apparatus which forms the subject matter of this invention.

The cabinet (FIG. 1) is of sheet steel construction, preferably stainless steel so as not to be adversely affected by corrosion from within or without; is provided at the top and bottom with storage compartments 10 and 12, closed by sliding or swinging doors 14 and 16; is provided with a working counter 18 which contains, at one end, hot plates 20, a sink 22, and has at the back 24, above the counter, controls 26 for the hot plates, hot and cold water spigots 28; and such other adjuncts as a soap dispenser, towel dispenser and paper cup dispenser (not shown). At the underside of the upper storage compartment 10 there are mounted appropriate lighting fixtures 32. Just below the counter there are drawers 34, a shelf 36 for trays, and a waste-disposal receptacle 38. Compressors for the ice maker and refrigerator are housed in a grill-faced compartment 40 below the shelf. Preferably the cabinet is set on a base 42 which will provide toe room at the front to facilitate working at the counter.

In accordance with this invention two of the upper compartments 14a and 14b are provided to contain an ice maker and storage bin, the latter having a dispensing spout 43 at the bottom which is located above the sink. A closure is provided for the spout, as will appear hereinafter, retractable by a handle 45 to effect dispensing directly into a receptacle held beneath the lower end of the spout.

Figure 6:
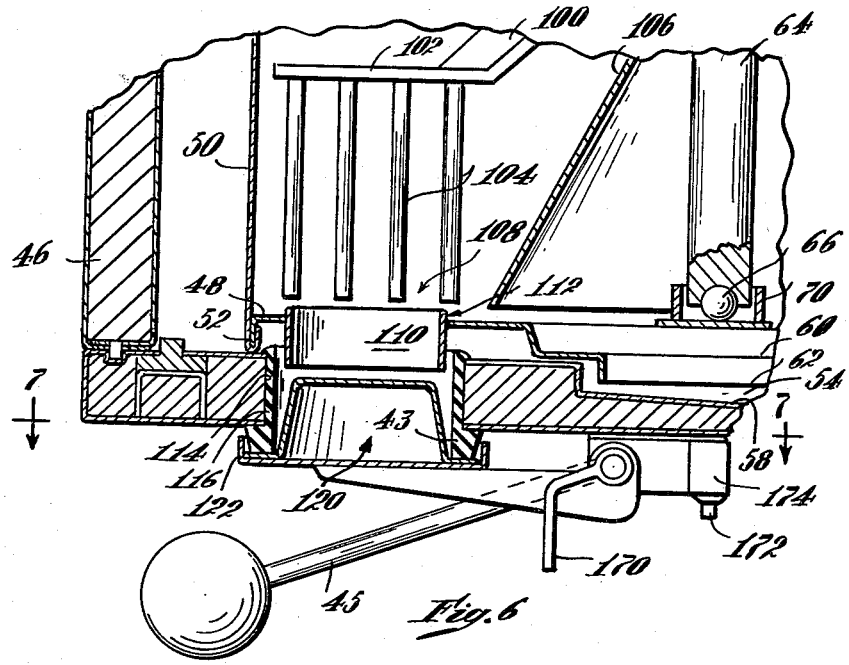
FIG. 6 is a vertical section taken on the line 6—6 of FIG. 5.

In one form of the apparatus (FIG. 3), the ice storage and dispensing bin 44 is disclosed as disposed in the compartment 14b, to the left of the center, which preferably is lined with a suitable insulation 46 so as to minimize melting. The storage bin 44 is a sheet metal container of circular horizontal section and is seated within the compartment on the bottom, the lower end of the bin having a bottom 48 which is elevated from the lower edge of its side walls 50 by an interlocking flange construction 52 (FIG. 6), which connects the side walls to the bottom. The bottom of the compartment has a recess 54 which is located substantially at the center of the bin 44 below the bottom wall 48, and a drain pipe 56 at its center. The bottom wall 48 of the bin has centrally thereof a depressed area 60 (FIGS. 3 and 6), which is adapted to receive water at the bottom of the bin to separate it from the ice. The depressed area 60 is concentric with the recess 54 and is provided with a discharge opening 62 which depends into the recess so that water, which flows into the depressed area, is discharged into the recess 54 and from thence to a drain pipe 56.

A shaft 64 is mounted in the bin in a vertical position. The lower end of the shaft is supported at the bottom of the bin on a ball 66 contained within a bearing cap 70. Near its upper end the shaft 64 is connected by a sleeve 72 to a hub 74 at the lower end of a shaft 76 journaled in a bearing sleeve 78, the latter being supported by brackets 80 bolted to the top of the compartment. The upper end of the shaft 76 has fastened to it a sprocket 82 about which there is entrained one end of a chain 84, the other end of which is entrained about a sprocket 86 (FIG. 4) fixed to a shaft 88 extending from a speed-reduction unit 90. The speed-reduction unit 90 is driven by a motor M through pulleys 92 and 94 and a belt 96 entrained about them.

Near the lower part of the bin 44 (FIGS. 3 and 6), there is a comb comprising a hub 98 fixed to the shaft 64 which has four downwardly inclined arms 100 extending radially therefrom 90° apart. Each arm 100 has at its lower end a horizontal, radially extending portion 102 which is substantially parallel to the bottom of the bin and a plurality of downwardly extending, spaced parallel teeth 104, there being four shown herein on each arm. The teeth are of circular cross-section and extend downwardly from their supporting arms to a point close to, but spaced from, the bottom. A conical shroud 106 is fastened to the hub 98 about the lower part of the shaft below the arms 100 and inwardly of the teeth 104. The lower end of the shroud is slightly larger in diameter than the diameter of the depressed area 60 and its lower edge is parallel to the bottom and spaced therefrom by an amount sufficient to permit flow of water from the surrounding area beneath it and into the depressed area. The shroud 106 moves in rotation with the comb as the shaft is rotated and its lower edge is close enough to the bottom to prevent ice granules from gaining access to the recess and hence being lost and, at the same time, its inclined surface helps to guide ice granules, situated above the comb, into the path of its teeth.

Figure 5:
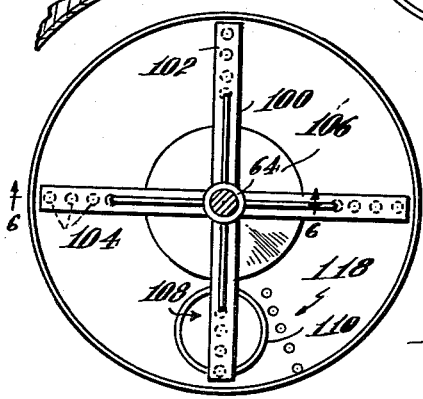
FIG. 5 is a horizontal section taken on the line 5—5 of FIG. 3.

A discharge opening 108 (FIGS. 5 and 6) is provided in the bottom in an eccentric position with respect to the depressed area 60 and a sleeve 110 is set into the opening so that its upper portion provides an upstanding flange 112 (FIG. 6) within the bin surrounding the opening. The upper edge of the flange lies in a plane closely adjacent to the lower ends of the teeth 104 so that these clear the edge and provide means for preventing water from escaping with the ice through the discharge opening 108. The lower wall of the compartment is provided with an opening 114 concentric with the discharge opening 108, within which is disposed a sleeve 116 of waterproof insulation which will not contaminate the ice discharged through the opening and may be kept clean. The lower part of the sleeve 110 extends downwardly into the sleeve 114 in telescoping relation therewith so as to guide the ice through the opening for discharge through the lower end of the insulator which constitutes the spout 43.

The ice is discharged by rotation of the comb, constituted by the four sets of teeth 104 which are moved in a circular path by rotation of the shaft 64, so as to sweep around the bottom of the bin and thus to sweep the granulated ice stored in the bin across the discharge opening 108. It is, of course, within the scope of the invention to employ a greater or lesser number of sets of teeth and to vary the number of teeth in each set. In order to break up packed ice granules, a plurality of teeth 118 (FIG. 5) are fixed to the bottom of the bin in vertically spaced, parallel relation so as to allow the teeth 104 on the comb to pass between them. The fixed teeth 118 check the ice granules from being pushed en masse past the opening 108, breaking it up so that it tends to disintegrate into free granules which readily flow through the opening. The fixed teeth 118 are of substantially the same dimensions as the movable teeth and extend upwardly from the bottom to a point just short of the lower sides of the horizontal portions 122 of the arms 100.

Figure 7:
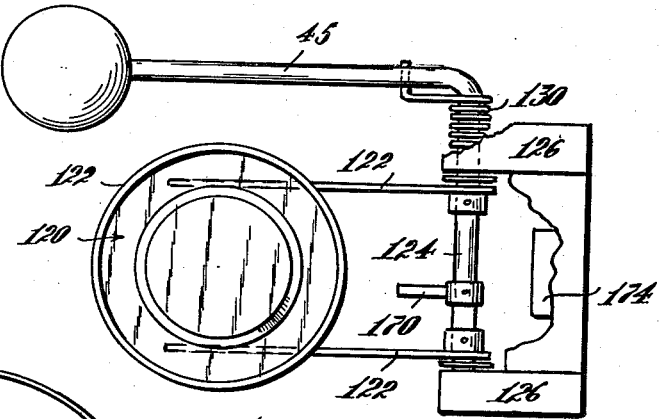
FIG. 7 is a horizontal section taken on the line 7—7 of FIG. 6.

A closure cap 120, having a peripheral sealing flange 122 for engagement with the spout 43, is provided for closing the lower end of the spout 43. The cap 120 (FIGS. 6 and 7) is fixed to the distal ends of a pair of lever arms 122—122, the proximal ends of which are, in turn, fixed to a shaft 124, the latter being rotatably supported in bearings 126—126 at the lower side of the compartment. The handle 45 is connected to one end of the shaft 124 by means of which the cap may be moved into and out of engagement with the spout. A coiled spring 130, connected at one end to the bearing at that side, yieldably holds the cap in a closed position.

Figure 8:
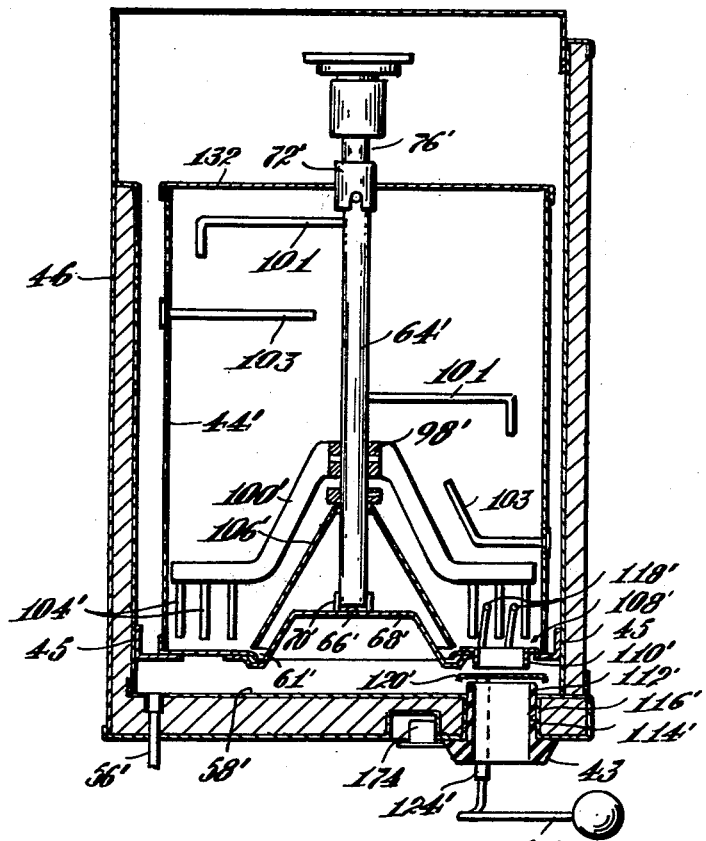
FIG. 8 is a vertical section through another form of dispenser.
Figure 9:
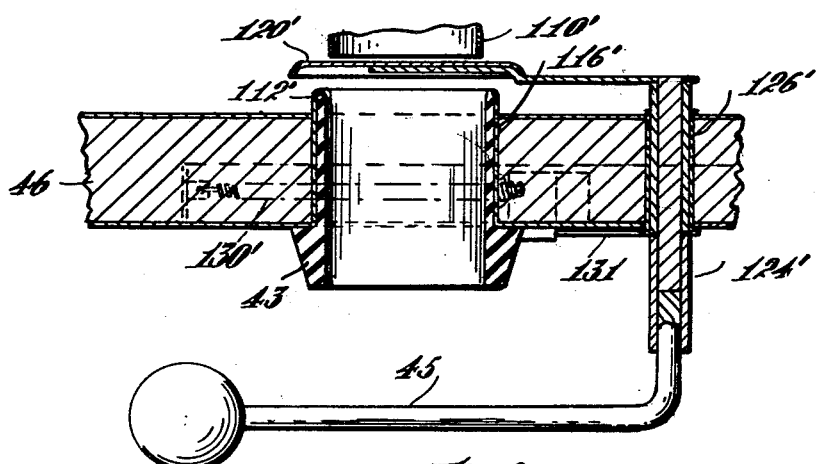
FIG. 9 is a fragmentary vertical section taken on the line 9—9 of FIG. 8.

In another and preferred form (FIGS. 8 and 9), the bin 44' has a central opening 61' at its bottom through which water may flow into the bottom of the compartment, the latter being provided with a suitable non-corrosive lining 58'. A drain pipe 56' is provided in the bottom of the compartment.

The shaft 64' is supported at its lower end on a ball 66' resting in a cup 70', the latter being welded to a support 68' fastened to the bottom of the bin. The upper end of the shaft 64' is releasably coupled to the lower end of the drive shaft 76' by a sleeve 72' containing notches for reception of pins fixed to the two shafts respectively. The bin may thus be removed by raising the sleeve 72' and sliding it forwardly on supporting tracks 45. The shaft 76' is driven as described heretofore.

A comb is fixed to the lower end of the shaft 64' and comprises a hub 98' and downwardly extending, radially disposed arms 100', to each of which is secured a plurality of spaced parallel teeth 104'. A conical shroud 106' is fast to the shaft below the arms, the lower end of which is slightly larger in diameter than the opening 61', so that it prevents escape of ice through the opening. The lower edge of the shroud is spaced from the bottom to permit water to drain through the opening. Although the shroud is shown fixed to the shaft so that it rotates therewith, it can be made stationary by fastening its lower edge to the bottom of the bin so long as the shaft turns within it.

Above the comb there are one or more anti-packing arms 101, 103, fixed respectively to the shaft 64' and the inside wall of the bin, radially with respect to the axis of the shaft 64'.

The discharge opening 108' (FIG. 8) is located at the bottom of the bin eccentrically with relation to the opening 61' and is provided with a downwardly projecting discharge sleeve 110'. Directly below the opening 108' the bottom of the compartment has an opening 114' lined with a sleeve 116', the upper end of which extends into the compartment providing an upstanding flange 112', which prevents water from escaping through the opening, and the lower end of which provides the spout 43. Ice is discharged by the comb and in order to break up the ice granules, as heretofore described, teeth 118' are fixed to the bottom of the container at the far side of the opening 108' in respect to the direction of rotation. The teeth 118' are preferably inclined relative to the teeth 104'.

The closure cap 120' is mounted between the lower end of the sleeve 110' and the upper end 112' of the sleeve 116' on the upper end of a vertically disposed spindle 124', the axis of which is eccentric with respect to the center of the sleeve 110' and is journaled in a bearing 126' extending through the bottom. The lower end of the spindle 124' has a horizontally disposed arm 45, so situated that a push exerted on the arm, for example, by placing a glass or other container against it and pushing toward the spout 43, will displace the closure cap. The closure cap 120' is made larger than the cross-sectional area of the sleeve 116' and its top and edge are smooth so that water which drips through the sleeve 110' spreads over its surface and is conducted thereby to the bottom of the compartment where it will be drained off through the drain pipe 56', thus eliminating any drip from the nozzle 43. The closure cap is normally held closed by a tension spring 130' anchored at one end to the bottom of the compartment and at its other end to an arm 131' fixed to the spindle 124'.

The bin, in either form, has a removable cover 132 (FIGS. 3 and 8), which contains an opening 133 through which granulated ice is introduced from an icemaker 134, the latter being situated in the compartment at the extreme left of the cabinet.

The ice maker (FIG. 3) is of conventional construction and hence will be described only in a general way. As illustrated herein, the ice maker comprises a unit 136 driven by a suitable coupling 138 from a speed-reduction unit 140 and motor M2. The unit 136 is provided with a water reservoir 142 which is supplied with water through a conduit 144, the latter being connected to a source of water supply. A conductor 146 supplies the water from the reservoir to the unit itself. Drain conduits 148 and 150 are provided to take care of overflow. Granulated ice is delivered from the top of the ice making unit 134 through an inclined rubber chute 154 which extends through an opening 156 in the wall, between the compartments, into a hopper 158 fastened to the cover 132, over the opening 133, so that it flows from the chute into the bin. The chute and hopper form a substantially closed passage from the ice maker to the bin so that the ice is protected from exposure and contamination.

According to one method of control (FIG. 3), a plate 160 is hinged within the opening 133 with its lower end bent at 162 so that, as the storage bin becomes filled with granulated ice, the plate 160 will be pushed upwardly about its hinge. The upper end of the plate 160 carries a finger 164 and this is movable by swinging movement of the plate to engage the actuator 166 of a limit switch 168. The switch 168 is included in the circuit of the ice maker (FIG. 3), so as to stop the ice making unit when the stroage bin is filled and to restart it when the level of the ice in the bin falls below a predetermined level.

In order to effect rotation of the comb when the ice is drawn out of the discharge opening at the bottom of the bin, the shaft 124 (FIGS. 6 and 7), to which the handle 128 is connected, has on it a finger 170 which is movable by downward movement of the handle in a direction to retract the cap 120 to engage the actuator 172 of a starting switch 174 (FIGS. 2, 6 and 7), for starting the motor M1. As soon as the closure is returned to its closed position the switch 174 is rendered inoperative so that the motor M1 is stopped, however, if sufficient granulated ice has been withdrawn so that the plate 160 hangs freely suspended, the switch 168 will be closed to start the motor M2 of the ice maker and it will continue to operate until enough ice has been made and disposed in the bin to refill it.

As the ice is discharged from the chute 154 into the bin it peaks up beneath the opening 134 and ultimately lifts the plate 160 which, in turn, actuates the switch 168 so as to stop the ice maker even though the bin is in fact not filled up. In order to insure uniform filling of the bin, a very sensitive thermostatic switch 180 (FIG. 2) is mounted near the top of the storage bin at a point where the ice enters the top through the opening 134. The thermostatic switch 180, which is normally open, is in the circuit of the motor M1 (FIG. 2), and when the ice peaks up to a height such as to cover or envelop the thermostatic switch 180, it closes and starts the motor M1. The motor M1 rotates the shaft 64 or 64', as the case may be, which, in turn, rotates the ice mass away from the thermostatic switch 180 thus uncovering it and allowing it to warm up whereupon the switch opens and the motor M1 stops. This will repeat each time the ice peaks up until the bin is full. The switch 168 is operated when the bin is filled by deflection of the plate 160 to shut off the ice maker.

Figure 2:
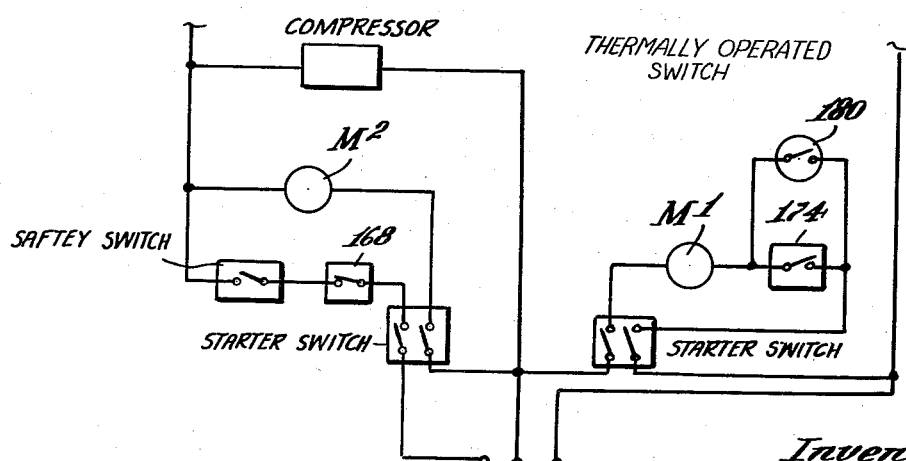
FIG. 2 is a wiring diagram of one control circuit.

Optionally, a control circuit such as shown in FIG. 10 may be used to take care of the problem of peaking. The circuit is substantially the same as shown in FIG. 2 except that a microswitch 182 is employed instead of the thermostatic switch 180. The microswitch 182 is mounted on the rubber chute 154 of the ice maker. When the ice peaks up under the chute it backs up into the chute causing the rubber to flex outwardly and thereby operate the microswitch. The microswitch completes the circuit through the motor M1, thus effecting rotation of the shaft 64 or 64' so as to rotate the peaked ice away from the lower end of the chute and allow it to return to its normal shape, thereby operating the microswitch to stop the motor. This is repeated each time the ice peaks up under the chute opening until such time as the ice level reaches a height such as to shut-off the ice maker. Optionally, a thermostat sensing element calibrated to shut-off the ice maker when in contact with the ice may be substituted for the plate 160 and switch 168. Since such thermostats are of conventional design, it is not specifically illustrated herein.

Other appropriate adjuncts may be provided such as a soap dispenser next to the sink, a paper towel dispenser and a cup dispenser. These latter may be fastened to the inner side of an end wall above the counter.

As herein illustrated, the storage bins 44 and 44' may be readily removed from its compartment by uncoupling the sleeve 72 or 72'. Thus, the bins may be removed for cleaning so as to keep them free of bacteria which are bound to collect from the too long presence of surface water.

It should be understood that the present disclosure is for the purpose of illustration only and that this invention includes all modifications and equivalents which fall within the scope of the appended claims.

I claim:

1. In a cabinet of the kind described, a storage bin for receiving granulated ice, said storage bin containing a filling opening at the top for receiving ice and a discharge opening at its bottom and a motor-driven comb for effecting discharge of ice through the discharge opening, a motor-driven ice maker operable to supply ice to the storage bin through the filling opening, of a sensing device adjacent the top of the storage bin operable, by contact of ice therewith, to stop the motor which drives the ice maker, a second sensing device adjacent the filling opening operable, by contact of ice therewith, to start the motor which drives the comb and to move the ice piled up below the filling opening away from the second sensing device and thereafter operable, by movement of the ice out of contact therewith, to stop the motor which drives the comb, said second sensing device operating repeatedly until the bin is filled and said first sensing device operating when the bin is filled to stop the motor which drives the ice maker.

2. For use with a cabinet of the kind described, a dispenser for supplying granulated ice, said dispenser comprising a storage chamber of circular horizontal section having a centrally disposed bottom opening for discharging water and an eccentrically disposed bottom opening for discharging ice, a shroud overlying the centrally disposed bottom opening for preventing access of ice thereto, a comb situated at the bottom of the storage chamber in the annular space between the wall of the chamber and the shroud with its lower edge parallel to the bottom, means supporting the comb for movement through the annular space at the bottom to sweep ice granules across the eccentrically disposed bottom opening to effect discharge of ice granules at the bottom through said bottom opening free of water, a normally closed closure disposed across the eccentrically disposed bottom opening and movable therefrom to permit discharge of ice, a handle operably connected to the closure for opening said closure, said handle being operable by positioning a vessel adjacent said eccentrically disposed bottom opening, and means operable, by opening of said closure, to initiate movement of the comb to effect discharge of ice through said eccentrically disposed bottom opening.

3. For use with a cabinet of the kind described, a dispenser for supplying granulated ice according to claim 2, wherein there is a depression at the bottom of the storage chamber concentric with the centrally disposed opening for conducting water which collects at the bottom of the storage chamber to said centrally disposed opening.

4. For use with a cabinet of the kind described, a dispenser comprising a storage bin for holding a quantity of granulated ice, said bin having in its bottom a centrally disposed opening for discharging water and an eccentrically disposed opening for discharging ice a shroud overlying the centrally disposed opening for preventing access of ice thereto, said shroud and wall of the bin providing an annular space at the bottom of the bin, said eccentrically disposed discharge opening being situated at the bottom of the annular space, a comb situated in the annular space at the bottom of the bin, means supporting the comb for movement in a horizontal plane parallel to the bottom, vertically disposed teeth carried by the comb adapted to sweep ice granules adjacent the bottom across the eccentrically disposed discharge opening, a plurality of teeth fixed to the bottom adjacent the eccentrically disposed opening at the far side, relative to the direction of movement of the comb, said fixed teeth being arranged to alternate with teeth on the comb, a part blocking discharge through said ecentrically disposed discharge opening, and means operable, by retraction of said part, to initiate movement of the comb.

5. For use with a cabinet of the kind described, a dispenser comprising a storage bin for holding a quantity of granulated ice, said bin having at its bottom a centrally disposed opening for discharging water and an eccentrically disposed opening for discharging ice, a shaft supported vertically in the bin with its axis at the center thereof, a comb fixed to the shaft near the bottom of the bin having teeth spaced from the axis, arranged to travel around the center across the eccentrically disposed discharge opening, a conical shroud disposed about the shaft inwardly of the teeth for excluding ice from the centrally disposed discharge opening and guiding ice ice into the path of movement of the teeth, a motor for effecting rotation of the shaft, a normally closed closure covering the discharge opening, a handle operably connected to the closure for opening the same, and means operable, by opening of the closure, to initiate operation of the motor.

6. For use with a cabinet of the kind described; a dispenser for supplying granulated ice comprising a storage bin for holding a quantity of granulated ice, said storage bin having a filling opening at the top for receiving ice, a discharge opening at the bottom through which ice may be discharged, a closure normally closing said discharge opening, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, means for effecting operation of the comb, means operative, by retraction of the closure, to initiate operation of said last named means, a sensing device near the top of the bin adjacent the filling opening through which the ice is supplied to the bin, and said sensing device being operable independently of the position of the closure, by contact with ice piled beneath the filling opening through which the ice is supplied to the bin, to effect operation of the comb, and thereafter operable, by movement of the ice away from it, to terminate operation of the comb.

7. For use with a cabinet of the kind described, a dispenser for dispensing granulated ice comprising in combination a storage bin for holding a quantity of granulated ice, said storage bin having a filling opening at the top for receiving ice for storage and a discharge opening at the bottom through which ice stored in the bin may be discharged and an ice maker for supplying ice to the bin through the filling opening; a closure normally closing said discharge opening, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, a first motor for driving the ice maker, a second motor for driving the comb, a sensing device adjacent the top of the bin operable, by contact of ice therewith, to stop said first motor, and a second sensing device situated adjacent the filling opening through which the ice is supplied to the bin, operable by contact with the ice to start the second motor, to move the ice piled up below the filling opening away from the second sensing device, and thereafter operable, by movement of the ice out of contact therewith, to stop the said second motor, said second sensing device operating repeatedly until the bin is filled, and said first sensing device operating when the bin is filled to stop the first motor.

8. For use with a cabinet of the kind described, a dispenser for dispensing granulated ice comprising in combination a storage bin for holding a quantity of granulated ice, said storage bin having a filling opening at the top for receiving ice for storage and a discharge opening at the bottom through which ice stored in the bin may be discharged and an ice maker for supplying ice to the bin through the filling opening; a closure normally closing said discharge opening, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, a first motor for driving the ice maker, a second motor for driving the comb, a first thermostatically operable switch situated adjacent the top of the bin operable, by contact of ice therewith, to stop the first motor, a second thermostatically operable switch situated adjacent the top of the bin adjacent the filling opening through which the ice enters the bin, said second thermostatically operable switch being operable, by contact with ice piled up below said filling opening, to start the second motor, and, by movement of the ice away from it, to stop the second motor, said second thermostatically operable switch being repeatedly operable to rotate the comb until the bin is filled, and said first thermostatically operable switch being operable when the bin is filled to stop the first motor.

9. For use with a cabinet of the kind described, a dispenser for dispensing granulated ice comprising in combination a storage bin for holding a quantity of granulated ice, said storage bin having a filling opening at the top for receiving ice for storage and a discharge opening at the bottom through which ice stored in the bin may be discharged and an ice maker for supplying ice to the bin through the filling opening; a closure normally closing said discharge opening, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, a first motor for driving the ice maker, a second motor for driving the comb, a first thermostat situated adjacent the top of the bin, a second thermostat situated adjacent the filling opening through which ice enters the bin, a first switch operable, by the first thermostat in response to contact of ice therewith, to stop the first motor, a second switch operable, by the second thermostat in response to contact of ice therewith, to start said second motor, and, by movement of the ice out of contact therewith, to stop said second motor, said second thermostat being repeatedly responsive to the contact of ice therewith to fill the bin to the level of the first thermostat and the first thermostat being operable when the ice reaches its level to stop the first motor.

10. For use with a cabinet of the kind described; a dispenser for supplying granulated ice comprising a storage bin for holding a quantity of granulated ice, said storage bin having a filling opening at the top for receiving ice, a discharge opening at the bottom of the bin through which ice may be discharged, a closure normally closing said discharge opening, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, a motor, means operably connecting the motor to the comb, spring means normally holding the closure closed and a switch operable, by retraction of the closure to initiate operation of the motor.

11. For use with a cabinet of the kind described; a dispenser for supplying granulated ice comprising a storage bin for holding a quantity of granulated ice, said storage bin having a filling opening at the top for receiving ice, a discharge opening at the bottom of the bin through which ice may be discharged, a spout connected to and extending downwardly from the discharge opening, said spout having a lower end, a closure situated in engagement with the lower end of the spout, said closure being normally closed and being movable downwardly therefrom to permit ice to flow through the spout to a receptacle held at its lower end, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, means for effecting operation of the comb, and means operative, by retraction of the closure, to initiate operation of said last-named means.

12. For use with a cabinet of the kind described; a dispenser for supplying granulated ice comprising a storage bin for holding a quantity of granulated ice, said storage bin having a filling opening at the top for receiving ice, a discharge opening at the bottom of the bin through which ice may be discharged, a spout having upper and lower ends, said spout being supported with its upper end spaced vertically below the discharge opening, a closure situated between the discharge opening and the upper end of the spout, said closure normally closing said discharge opening and being movable laterally to uncover the discharge opening to permit ice to flow from the discharge opening through the spout to a receptacle held against its lower end, means exteriorly of the bin operable, by positioning of a vessel close to the discharge opening to receive ice therefrom, to open said closure, a comb having teeth, said comb being arranged adjacent the bottom of the bin and being arranged adjacent the bottom of the bin and being operative to sweep granules of ice across the bottom and across the discharge opening, means for effecting operation of the comb, and means operative, by retraction of the closure, to initiate operation of said last-named means.

13. For use with a cabinet of the kind described; a dispenser for supplying granulated ice comprising a storage bin for holding a quantity of granulated ice, said storage bin having a filling opening at the top for receiving ice, a discharge opening at the bottom of the bin through which ice may be discharged, said bin having a bottom elevated from the bottom of the cabinet, a spout projecting upwardly into the cabinet below the discharge opening, said spout having upper and lower ends and being supported with its upper end spaced vertically below the discharge opening, a closure of larger diameter than the upper end of the spout supported between the upper end of the spout and the discharge opening so that water falling through the discharge opening is conducted by contact with the top of the closure to the bottom of the cabinet, a drain pipe for conducting water which accumulates at the bottom of the cabinet therefrom, said closure normally closing said discharge opening, means exteriorly of the bin operable, by positioning of a vessel close to the discharge opening to receive ice therefrom, to open said closure, a comb having teeth, said comb being arranged adjacent the bottom of the bin and being operative to sweep granules of ice across the bottom and across the discharge opening, means for effecting operation of the comb, and means operative, by retraction of the closure, to initiate operation of said last-named means.

References Cited by the Examiner

UNITED STATES PATENTS

| | | | |
|---|---|---|---|
| 1,639,370 | 8/27 | Flegel | 222—339 |
| 2,340,721 | 2/44 | Whitney | 62—137 |
| 2,724,949 | 11/55 | Kattis | 62—344 |
| 2,779,165 | 1/57 | Pichler | 62—320 |
| 2,969,650 | 1/61 | Eschenburg | 62—344 |
| 3,021,686 | 2/62 | Alt | 62—344 |
| 3,059,450 | 10/62 | Mueller et al. | 62—344 |
| 3,075,363 | 1/63 | Conto | 62—344 X |

ROBERT A. O'LEARY, *Primary Examiner.*

MEYER PERLIN, *Examiner.*